United States Patent
Kumar

(10) Patent No.: US 9,746,371 B1
(45) Date of Patent: Aug. 29, 2017

(54) LIGHT SENSOR CALIBRATION SYSTEM AND METHOD

(71) Applicant: Crestron Electronics, Inc., Rockleigh, NJ (US)

(72) Inventor: Russikesh Kumar, Ridgewood, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 15/403,319

(22) Filed: Jan. 11, 2017

(51) Int. Cl.
*H05B 37/02* (2006.01)
*G01J 1/44* (2006.01)
(Continued)

(52) U.S. Cl.
CPC .............. *G01J 1/44* (2013.01); *G01J 1/4204* (2013.01); *H05B 33/0854* (2013.01);
(Continued)

(58) Field of Classification Search
CPC ............ H05B 33/0854; H05B 37/0218; H05B 37/0227; H05B 37/0272; G01J 1/44; G01J 1/4204; G01J 2001/444
(Continued)

(56) References Cited

U.S. PATENT DOCUMENTS 5,701,058 A * 12/1997 Roth .................. H05B 37/0218
250/214 D
7,781,713 B2 8/2010 Papamichael et al.
(Continued)

*Primary Examiner* — Don Le
(74) *Attorney, Agent, or Firm* — Crestron Electronics, Inc

(57) ABSTRACT

A method and a lighting control system for automatically determining a calibration curve for use in daylight harvesting applications. The lighting control system comprises a light sensor configured for recording light levels and a load controller configured for provide a dimmed output to a lighting load. The calibration curve comprises a calibration slope ($S_C$) defined by a calibration coordinate ($C_C$) and a night coordinate ($C_N$). The calibration coordinate ($C_C$) comprises a calibration dimming level ($D_C$) set by a user and a calibration light level ($L_C$) recorded by the light sensor when the lighting load is set to the calibration dimming level ($D_C$). The night coordinate ($C_N$) comprises a night scene dimming level ($D_N$) and a night scene light level ($L_N$), wherein the night scene light level ($L_N$) comprises a difference between a sunlight plus night scene light level ($L_{NS}$) recorded by the light sensor when the lighting load is set to the night scene dimming level ($D_N$) and a sunlight level ($L_S$) recorded by the light sensor when the lighting load is turned off.

23 Claims, 9 Drawing Sheets

(51) Int. Cl.
*H05B 33/08* (2006.01)
*G01J 1/42* (2006.01)

(52) U.S. Cl.
CPC ..... *H05B 37/0218* (2013.01); *H05B 37/0227* (2013.01); *H05B 37/0272* (2013.01); *G01J 2001/444* (2013.01)

(58) Field of Classification Search
USPC .......................................................... 315/129
See application file for complete search history.

(56) References Cited

U.S. PATENT DOCUMENTS

| | | | |
|---|---|---|---|
| 8,410,706 B2 | 4/2013 | Steiner et al. | |
| 8,648,550 B2 | 2/2014 | Staab | |
| 9,609,721 B1* | 3/2017 | Hutz | H05B 37/0218 |
| 2006/0278808 A1* | 12/2006 | Hick | G01J 1/18 |
| | | | 250/205 |
| 2008/0165116 A1* | 7/2008 | Herz | G09G 3/3406 |
| | | | 345/102 |
| 2011/0127928 A1* | 6/2011 | Ayala | H05B 41/2881 |
| | | | 315/297 |
| 2011/0221350 A1* | 9/2011 | Staab | H05B 37/0218 |
| | | | 315/154 |
| 2012/0321321 A1* | 12/2012 | Riesebosch | H04B 10/116 |
| | | | 398/118 |
| 2014/0292208 A1* | 10/2014 | Chemel | H05B 33/0854 |
| | | | 315/154 |
| 2015/0271887 A1* | 9/2015 | Pandharipande | H05B 37/0218 |
| | | | 315/151 |
| 2016/0370231 A1* | 12/2016 | Agahian | G01J 3/50 |
| 2017/0016761 A1* | 1/2017 | Denteneer | G01J 1/4204 |

\* cited by examiner

LIGHT SENSOR CALIBRATION SYSTEM AND METHOD

BACKGROUND OF THE INVENTION

Technical Field

Aspects of the embodiments relate to a light sensor, and more specifically to a light sensor calibration system and method.

Background Art

Efficient and productive use of spaces and resources is an increasingly important goal for businesses and organizations. Given current concerns about energy costs and public perception, this trend should continue for the foreseeable future. Light sensors, or photo sensors, are a crucial component in realizing this goal.

Light sensors are a common component in many buildings. Typically mounted on ceilings, light sensors detect light levels within an area. They are most commonly used to control the power delivered to electrical loads, specifically lights, depending on the detected light levels of the monitored area. Commercial building spaces often require daylight harvesting whereby artificial light sources are reduced in brightness as the amount of sunlight entering the space increases. The goal is to reduce energy consumption while not reducing light levels below desired levels. Typically, a signal is transmitted to a dimming device to control the load.

Although most commonly used to directly control a load, light sensors are increasingly employed in control systems such as Building Automation Systems (BAS). BAS, also known as Building Management Systems (BMS) and Energy Management Systems (EMS), are employed in buildings and structures to control and monitor a building's mechanical and electrical equipment. BAS are implemented in buildings in varying degrees of complexity and increase efficiency by exploiting relationships of interrelated components and sharing information to more accurately meet demand. In addition to controlling a load, light sensors employed in BAS may also be networked to other components in the system to share information. Networked light sensors may transmit and receive information to other network components such as central controllers.

Methods of calibrating such systems can often be complex and time consuming requiring multiple actions at different times by the field engineer to set calibration set points, such as a daytime calibration set point and a nighttime calibration set point. Accordingly, a need has arisen for a quick and simple to implement calibration system and method for light sensors.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for a light sensor that will obviate or minimize problems of the type previously described.

More particularly, it is an aspect of the embodiments to provide systems, methods, and modes for a light sensor calibration system and method.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to an aspect of the embodiments, a lighting control system for calibrating a light sensor is provided. The lighting control system comprises a light sensor configured for recording light levels, a load controller electrically connected to a lighting load and configured for providing a dimmed output to the lighting load, and at least one processor comprising a memory encoding one or more processor executable instructions. According to an embodiment, the at least one processor is configured for determining a calibration curve by: (i) receiving a command to initiate calibration; (ii) recording a set dimming level of the lighting load as a calibration dimming level ($D_C$); (iii) storing a calibration coordinate ($C_C$) comprising the calibration dimming level ($D_C$) and a calibration light level ($L_C$) recorded by the light sensor when the lighting load is set to the calibration dimming level ($D_C$); (iv) storing a night coordinate ($C_N$) comprising a night scene dimming level ($D_N$) and a night scene light level ($L_N$), wherein the night scene light level ($L_N$) comprises a difference between a sunlight plus night scene light level ($L_{NS}$) recorded by the light sensor when the lighting load is set to the night scene dimming level ($D_N$) and a sunlight level ($L_S$) recorded by the light sensor when the lighting load is turned off; and (v) determining a calibration curve comprising a calibration slope ($S_C$) that intercepts the calibration coordinate ($C_C$) and the night coordinate ($C_N$).

According to an embodiment, the light sensor may be configured for transmitting the recorded light levels to the load controller. According to various aspects of the embodiments, the calibration curve is determined by the light sensor or the load controller.

According to an embodiment, the load controller may be further configured for receiving control commands from a lighting control device, wherein the lighting control device comprises a user interface configured for receiving control commands from a user. According to an embodiment, the lighting control device may be configured for determining the calibration curve. According to another embodiment, the load controller comprises a lighting control device comprising a user interface configured for receiving control commands from a user. According to another embodiment, the light sensor may be incorporated with the load controller.

According to an embodiment, the calibration dimming level ($D_C$) may be manually set by a user. The calibration dimming level ($D_C$) may be set by the user before initiating calibration or during calibration. According to an embodiment, the command to initiate calibration may be received from a user interface. According to an embodiment, after initiating calibration, the light sensor may be configured for waiting for a predetermined amount of time before capturing the calibration light level ($L_C$).

According to an embodiment, the light sensor may record a plurality of light levels and average these measurements to determine the calibration light level ($L_C$), the sunlight plus night scene night level ($L_{NS}$), and the sunlight level ($L_S$). According to an embodiment, the light sensor may transmit a command to the load controller to set the lighting load to the night scene dimming level ($D_N$) to record the sunlight plus night scene light level ($L_{NS}$); and wherein the light sensor transmits a command to the load controller to turn the lighting load off to record the sunlight level ($L_S$). According to an embodiment, the light sensor calculates the night scene light level ($L_N$). The night scene dimming level ($D_N$) may be a dimming level at which the lighting load is set to be turned on during the night. The night scene dimming level ($D_N$) may comprise a dimming level in the range of about 75% to about 100%.

According to a further aspects of the embodiments, the at least one processor may be further configured for determining whether the determined calibration slope ($S_C$) is larger than a maximum acceptable slope ($S_{MAX}$). When the determined calibration slope ($S_C$) is larger than the maximum acceptable slope ($S_{MAX}$), the processor adopts the maximum acceptable slope ($S_{MAX}$) for the calibration curve. When the determined calibration slope ($S_C$) is smaller than the maximum acceptable slope ($S_{MAX}$), the processor adopts the determined calibration slope ($S_C$) for the calibration curve.

According to another embodiment, the at least one processor is further configured for determining whether the determined calibration slope ($S_C$) is inverted. When the determined calibration slope ($S_C$) is inverted, the processor issues an error message. When the determined calibration slope ($S_C$) is not inverted, the processor adopts the determined calibration slope ($S_C$) for the calibration curve.

According to an embodiment, the load controller uses the calibration curve for daylight harvesting operation during which the load controller is configured for: receiving a light level reading from the light sensor, mapping the received light level reading to the calibration curve to determine a corresponding dimming level, and adjusting the lighting load to the corresponding dimming level. According to an embodiment, when the corresponding dimming level is lower than a predefined minimum dimming level, the load controller is configured for adjusting the lighting load to the minimum dimming level. According to an embodiment, when the corresponding dimming level is larger than the night scene dimming level ($D_N$), the load controller is configured for adjusting the lighting load to the night scene dimming level ($D_N$).

According to another aspect of the embodiments, a lighting control system for calibrating a light sensor is provided. The lighting control system comprises a light sensor configured for detecting light levels and a load controller electrically connected to the lighting load and configured for providing a dimmed output to the lighting load. The light sensor may be configured for receiving a calibration command and in response: (i) capturing a calibration light level ($L_C$) when a lighting load is set to a calibration dimming level ($D_C$); (ii) transmitting a command to set the lighting load to a night scene dimming level ($D_N$); (iii) capturing a sunlight plus night scene light level ($L_{NS}$) when the lighting load is set to the night scene dimming level ($D_N$); (iv) transmitting a command to turn the lighting load off; (v) capturing a sunlight level ($L_S$) when the lighting load is turned off; (vi) determining a night scene light level ($L_N$) by calculating a difference between the sunlight plus night scene light level ($L_{NS}$) and the sunlight level ($L_S$); and (vii) transmitting the calibration light level ($L_C$) and the night scene light level ($L_N$). The load controller may be further configured for determining a calibration curve by: (i) recording a set dimming level of the lighting load as the calibration dimming level ($D_C$); (ii) receiving the calibration light level ($L_C$) and the night scene light level ($L_N$); (iii) storing a calibration coordinate ($C_C$) comprising the calibration dimming level (Do) and the calibration light level ($L_C$); (iv) storing a night coordinate ($C_N$) comprising the night scene dimming level ($D_N$) and the night scene light level ($L_N$); and (v) determining a calibration curve comprising a calibration slope ($S_C$) that intercepts the calibration coordinate ($C_C$) and the night coordinate ($C_N$).

According to a further aspect of the embodiments, a method of calibrating a light sensor is provided. The method comprises: (i) initiating calibration; (ii) recording a set dimming level of a lighting load as a calibration dimming level ($D_C$); (iii) capturing a calibration light level ($L_C$) by a light sensor when the lighting load is set to the calibration dimming level ($D_C$); (iv) storing a calibration coordinate ($C_C$) comprising the calibration dimming level ($D_C$) and the calibration light level ($L_C$); (v) setting the lighting load to a night scene dimming level ($D_N$); (vi) capturing a sunlight plus night scene light level ($L_{NS}$) by the light sensor when the lighting load is set to the night scene dimming level ($D_N$); (vii) turning the lighting load off; (viii) capturing a sunlight level ($L_S$) by the light sensor when the lighting load is turned off; (ix) storing a night coordinate ($C_N$) comprising the night scene dimming level ($D_N$) and a night scene light level ($L_N$) comprising a difference between the sunlight plus night scene light level ($L_{NS}$) and the sunlight level ($L_S$); and (x) determining a calibration curve comprising a calibration slope ($S_C$) that intercepts the calibration coordinate ($C_C$) and the night coordinate ($C_N$).

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWINGS

Figure 1:
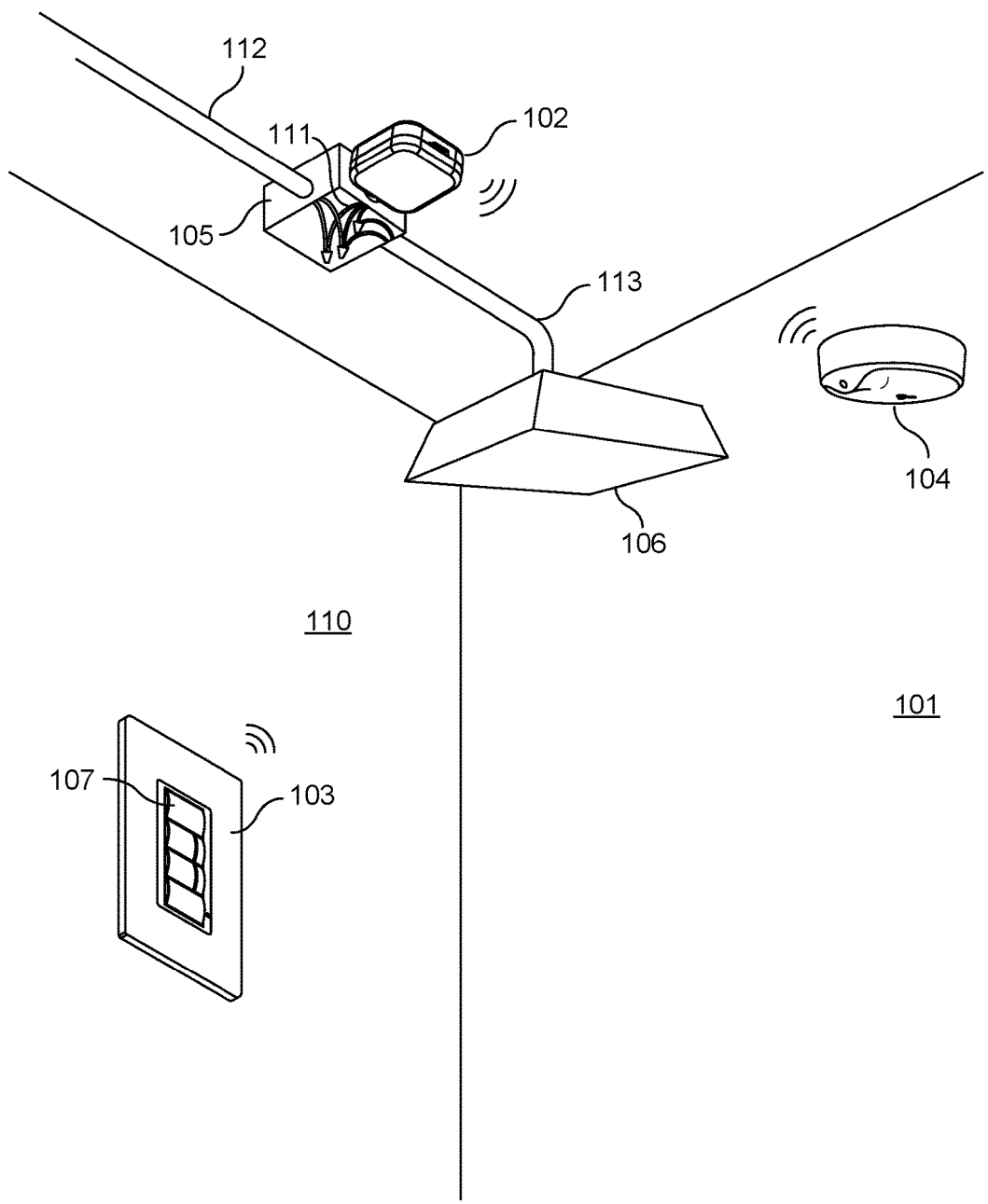

FIG. 1 shows a diagram of a lighting control system according to an illustrative aspect of the embodiments.

Figure 2:
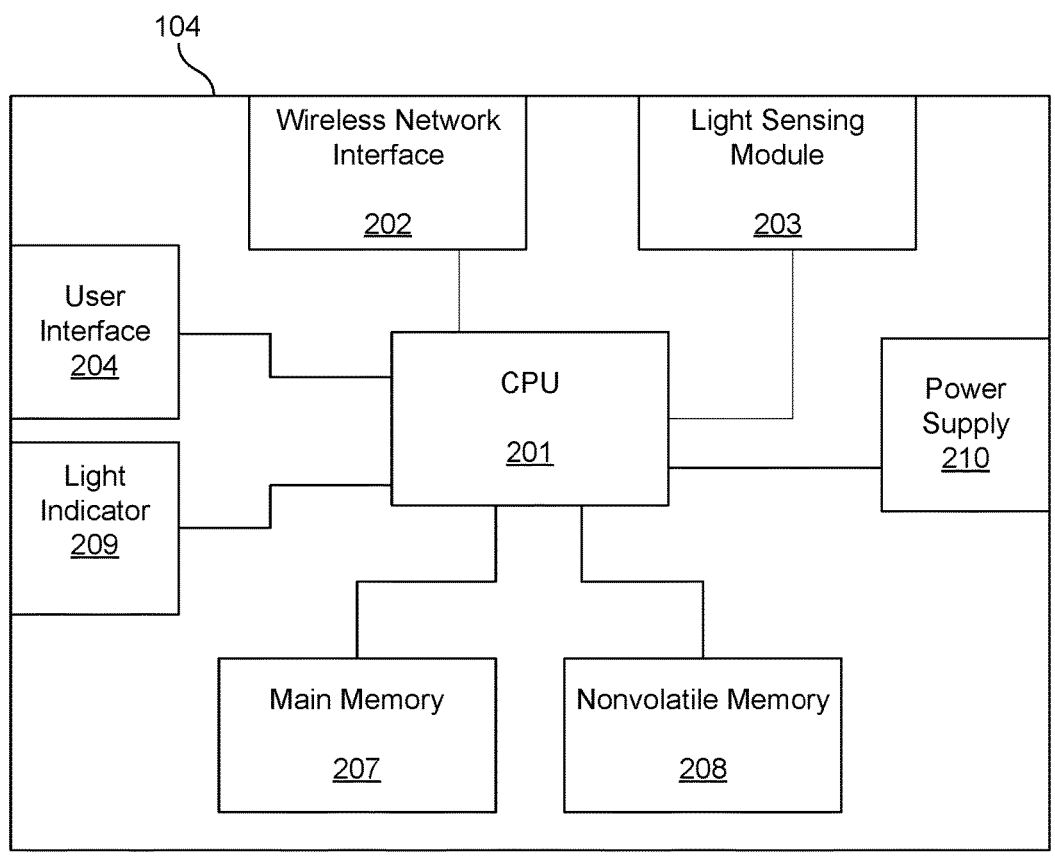

FIG. 2 is an illustrative block diagram of a light sensor according to an illustrative aspect of the embodiments.

Figure 3:
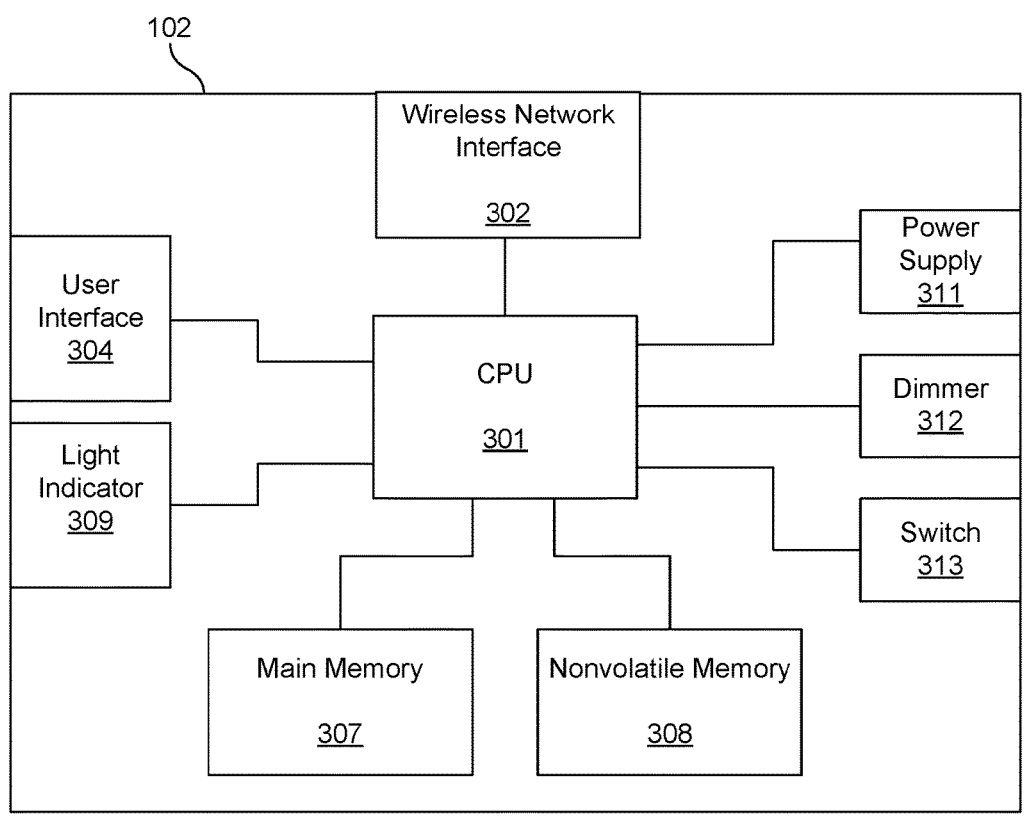

FIG. 3 is an illustrative block diagram of a load controller according to an illustrative aspect of the embodiments.

Figure 4:
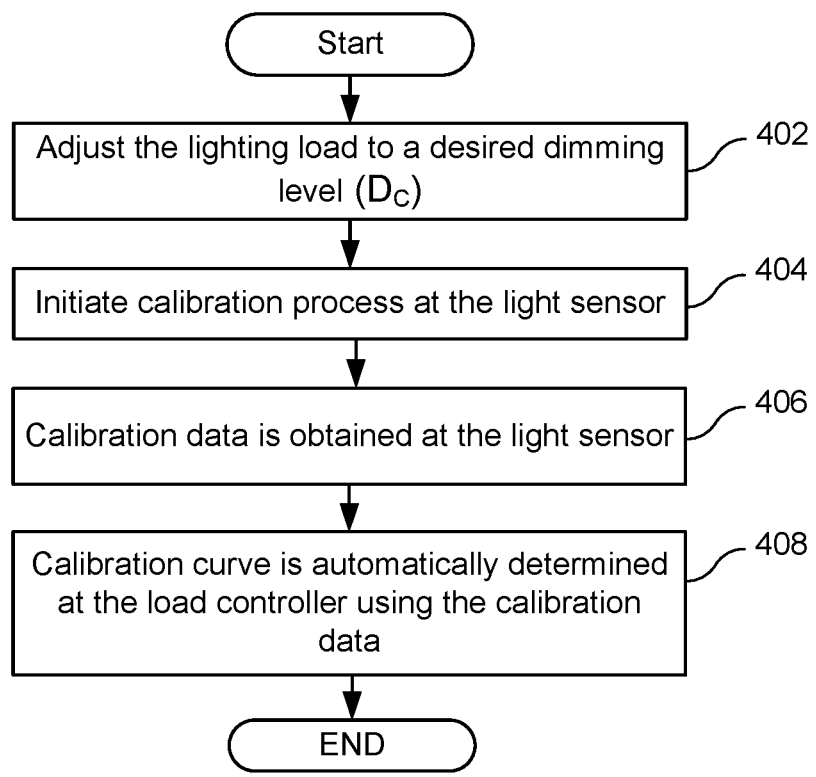

FIG. 4 is a flowchart illustrating the steps for a method of automatically determining a calibration curve according to according to an illustrative aspect of the embodiments.

Figure 5:
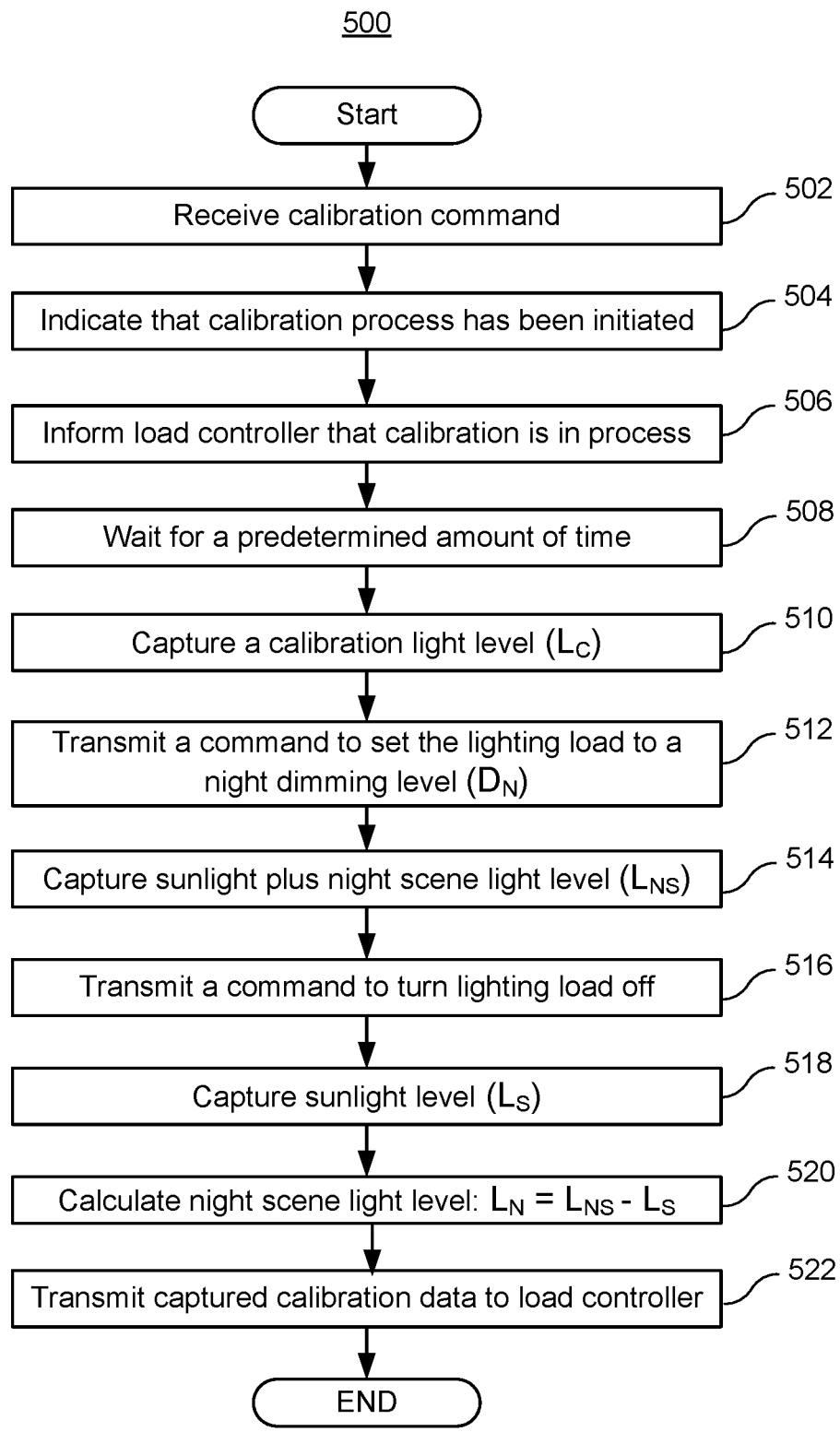

FIG. 5 is a flowchart illustrating the steps for a method performed by the light sensor during the calibration process according to an illustrative aspect of the embodiments.

Figure 6:
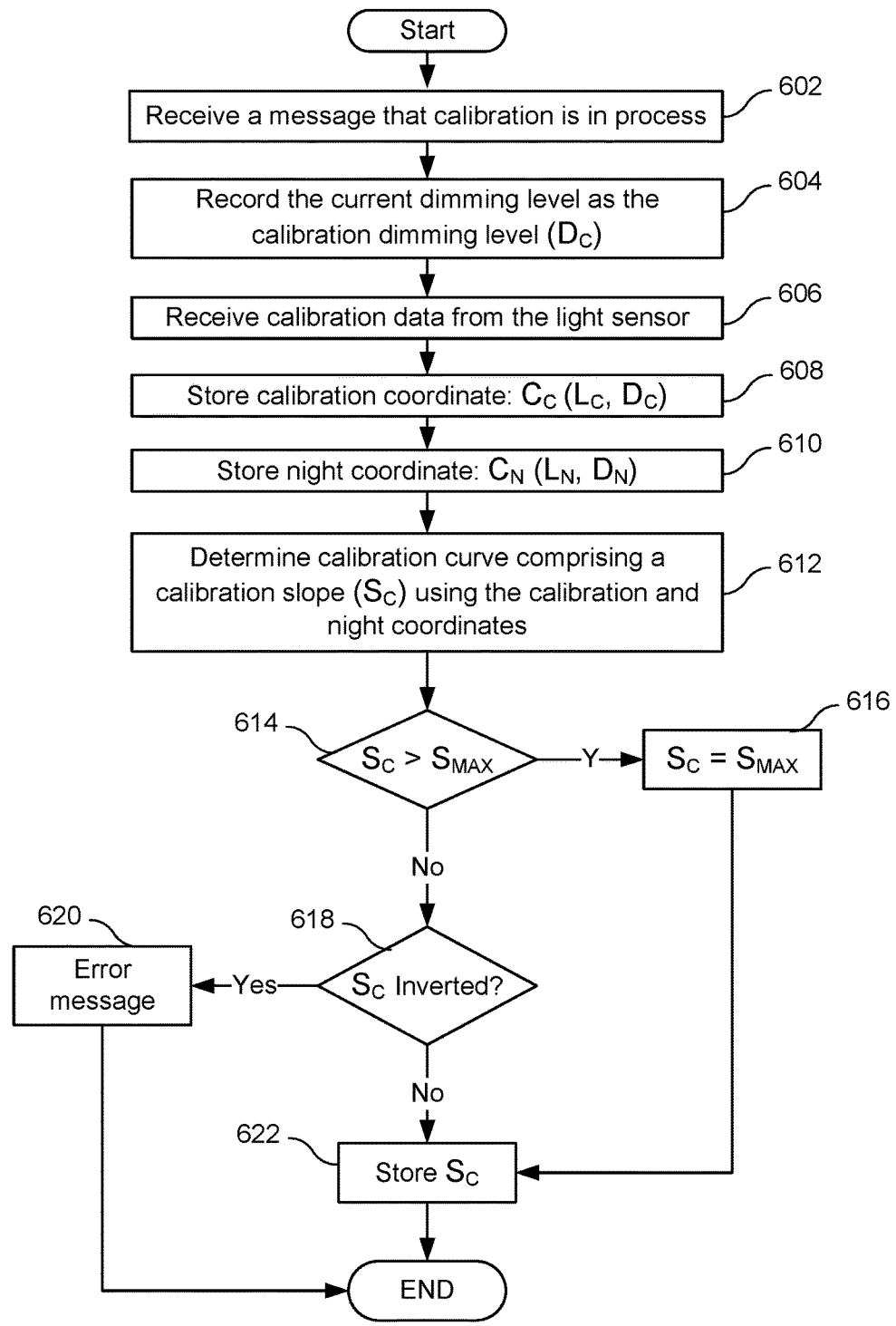

FIG. 6 is a flowchart illustrating the steps for a method performed by the load controller during the calibration process according to an illustrative aspect of the embodiments.

Figure 7:
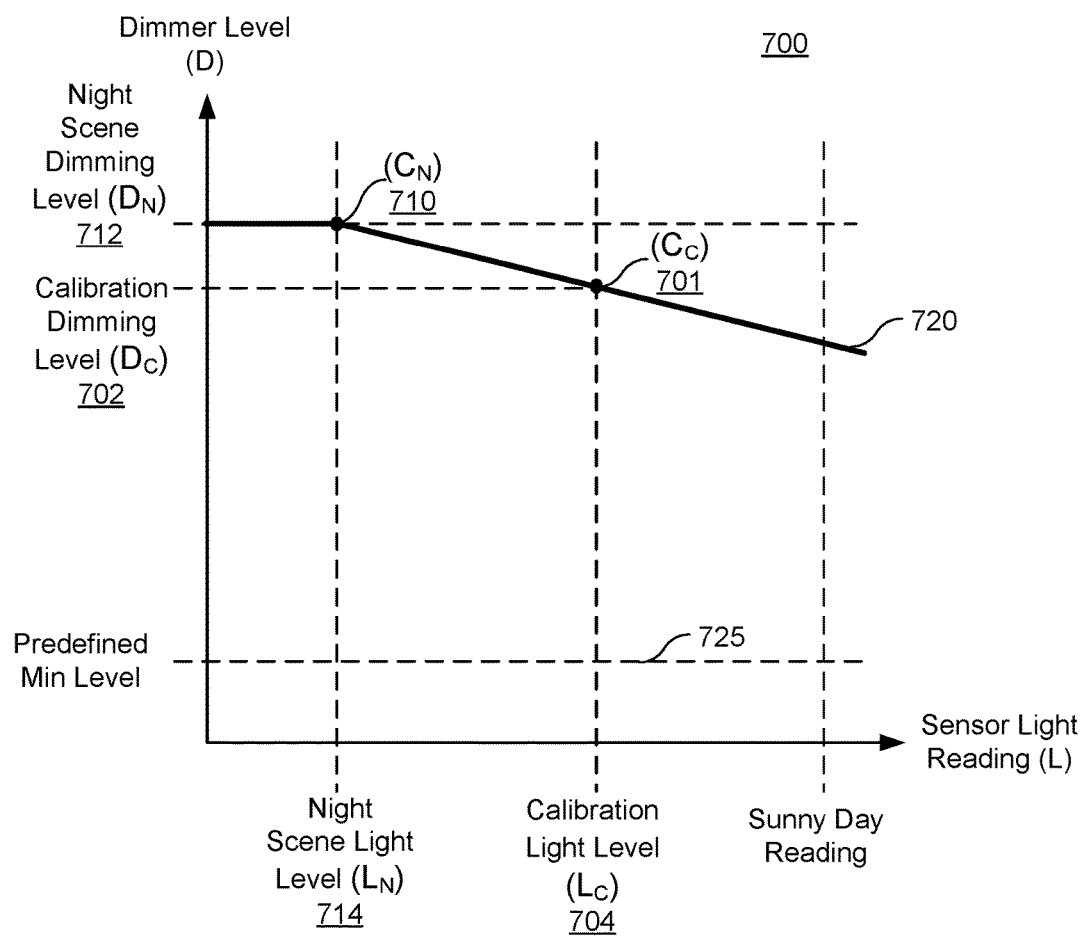

FIG. 7 is an illustrative sensor light level (L) versus dimmer level (D) chart showing an automatically determined calibration curve according to an illustrative aspect of the embodiments.

Figure 8:
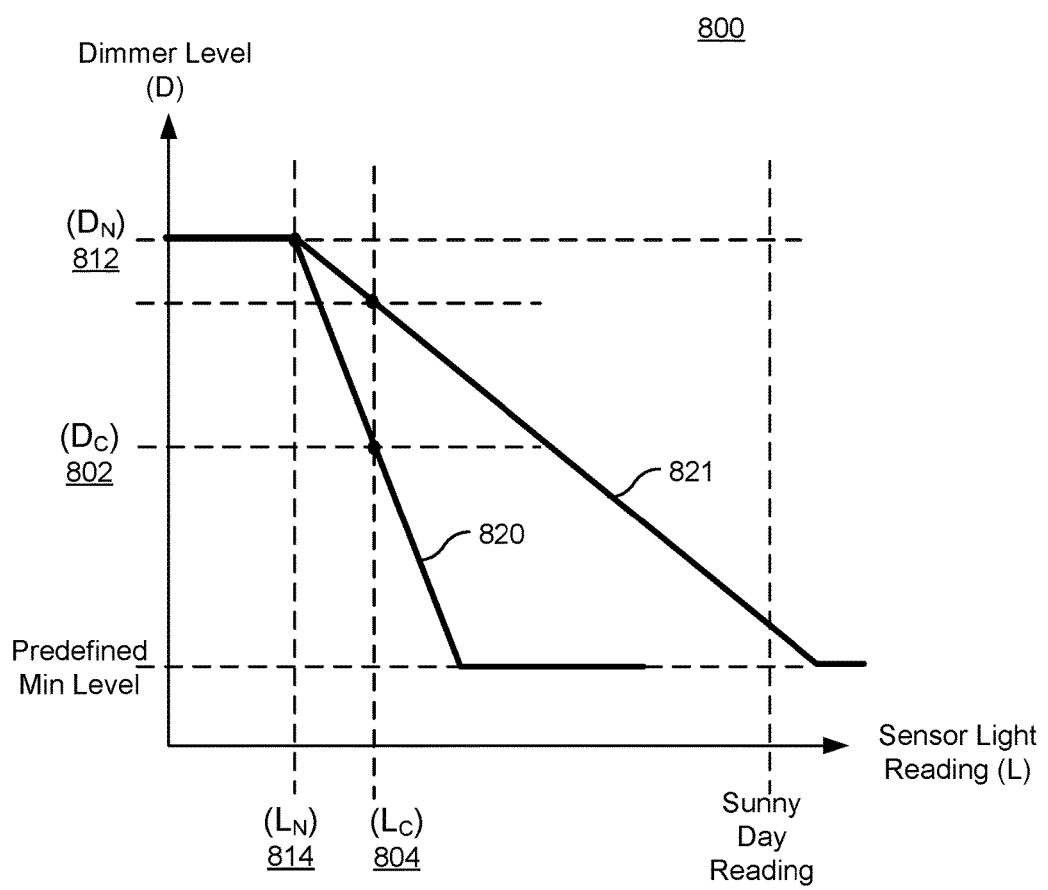

FIG. 8 is an illustrative sensor light level (L) versus dimmer level (D) chart showing a calibration curve with an overly steep slope according to an illustrative aspect of the embodiments.

Figure 9:
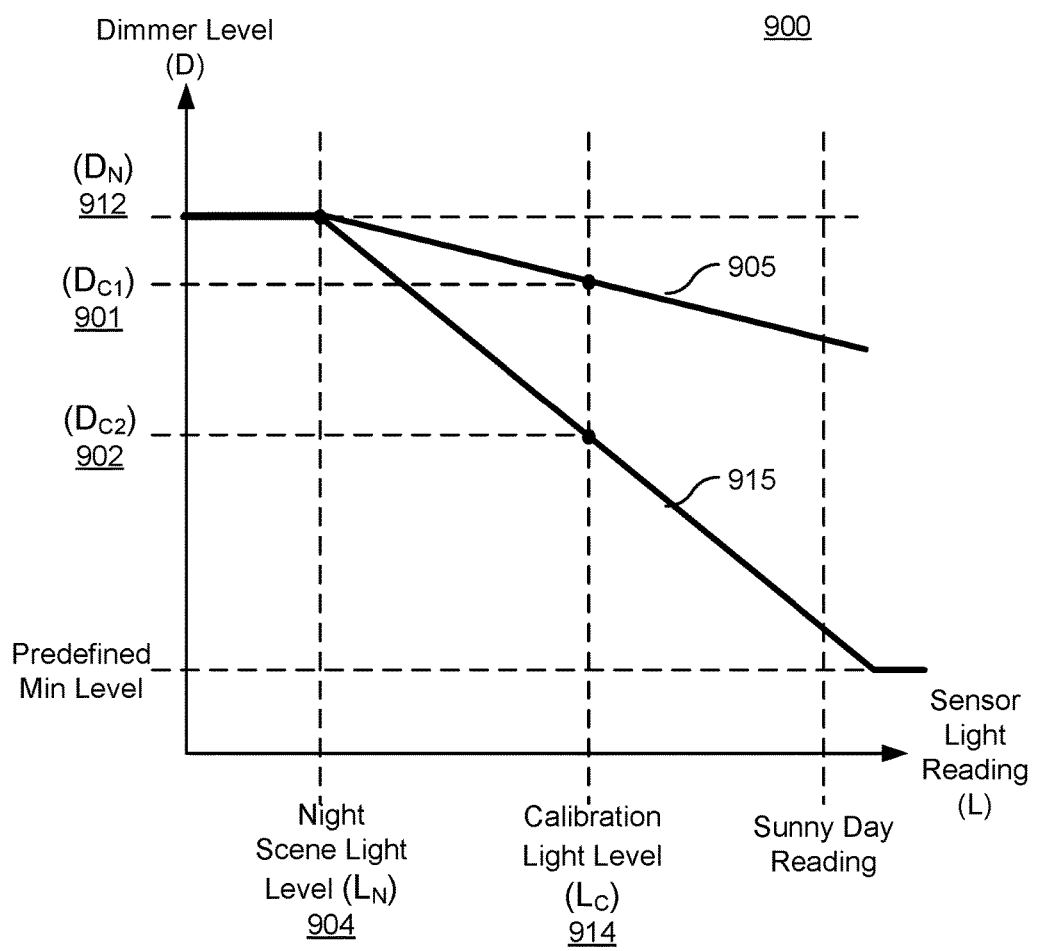

FIG. 9 is an illustrative sensor light level (L) versus dimmer level (D) chart showing two different calibration curves for two load controllers according to an illustrative aspect of the embodiments

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. The detailed description that follows is written from the point of view of a control systems company, so it is to be understood that generally the concepts discussed herein are applicable to various subsystems and not limited to only a particular controlled device or class of devices.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

| | |
|---|---|
| 100 | Lighting Control System |
| 101 | Room |
| 102 | Load Controller |
| 103 | Lighting Control Device |
| 104 | Light Sensor |
| 105 | Junction Box |
| 106 | Lighting Load |
| 107 | Buttons |
| 110 | Wireless Network |
| 111 | Wire Leads |
| 112 | Voltage Line |
| 113 | Load Line |
| 201 | Central Processing Unit (CPU) |
| 202 | Wireless Network Interface |
| 203 | Light Sensing Module |
| 204 | User Interface |
| 207 | Main Memory |

-continued

| | |
|---|---|
| 208 | Nonvolatile Memory |
| 209 | Light Indicator |
| 210 | Power Supply |
| 301 | Central Processing Unit (CPU) |
| 302 | Wireless Network Interface |
| 304 | User Interface |
| 307 | Main Memory |
| 308 | Nonvolatile Memory |
| 309 | Light Indicator |
| 311 | Power Supply |
| 312 | Dimmer |
| 313 | Switch |
| 400 | A Flowchart Illustrating the Steps for a Method of Automatically Determining a Calibration Curve |
| 402-408 | Steps of Flowchart 400 |
| 500 | A Flowchart Illustrating the Steps for a Method Performed by the Light Sensor During the Calibration Process |
| 502-522 | Steps of Flowchart 500 |
| 600 | A Flowchart Illustrating the Steps for a Method Performed by the Load Controller During the Calibration Process |
| 602-622 | Steps of Flowchart 600 |
| 700 | Sensor Light Level (L) Versus Dimmer Level (D) Chart Showing an Automatically Determined Calibration Curve |
| 701 | Calibration Coordinate ($C_C$) |
| 702 | Calibration Dimming Level ($D_C$) |
| 704 | Calibration Light Level ($L_C$) |
| 710 | Night Coordinate ($C_N$) |
| 712 | Night Dimming Level ($D_N$) |
| 714 | Night scene light level ($L_N$) |
| 720 | Calibration Curve |
| 725 | Minimum Dimming Level |
| 800 | Sensor Light Level (L) Versus Dimmer Level (D) Chart Showing a Calibration Curve with an Overly Steep Slope |
| 802 | Calibration Dimming Level ($D_C$) |
| 804 | Calibration Light Level ($L_C$) |
| 812 | Night Dimming Level ($D_N$) |
| 814 | Night scene light level ($L_N$) |
| 820 | Calibration Curve Comprising Calculated Calibration Slope ($S_C$) |
| 821 | Calibration Curve Comprising Maximum Acceptable Slope ($S_{MAX}$) |
| 900 | Sensor Light Level (L) Versus Dimmer Level (D) Chart Showing Two Different Calibration Curves for Two Load Controllers |
| 901 | First Calibration Dimming Level ($D_{C1}$) |
| 902 | First Calibration Dimming Level ($D_{C2}$) |
| 904 | Night scene light level ($L_N$) |
| 905 | First Calibration Curve |
| 912 | Night Dimming Level ($D_N$) |
| 914 | Calibration Light Level ($L_C$) |
| 915 | Second Calibration Curve |

LIST OF ACRONYMS USED IN THE SPECIFICATION IN ALPHABETICAL ORDER

The following is a list of the acronyms used in the specification in alphabetical order.

| | |
|---|---|
| AC | Alternating Current |
| ASIC | Application Specific Integrated Circuit |
| AV | Audiovisual |
| BAS | Building Automation Systems |
| BMS | Building Management Systems |
| EMS | Energy Management Systems |
| $C_C$ | Calibration Coordinate |
| $C_N$ | Night Coordinate |
| CPU | Central Processing Unit |
| D | Dimming Level |
| DC | Direct Current |
| $D_C$ | Calibration Dimming Level |
| $D_N$ | Night Dimming Level |
| ID | Identification Number |
| Hz | Hertz |
| HVAC | Heating, Ventilation and Air Conditioning |
| L | Light Level |
| $L_C$ | Calibration Light Level |
| LED | Light Emitting Diode |

| | |
|---|---|
| $L_N$ | Night scene light level |
| $L_{NS}$ | Sunlight Plus Night Scene Light Level |
| PAN | Personal Area Network |
| RAM | Random-Access Memory |
| RF | Radio Frequency |
| RISC | Reduced Instruction Set |
| ROM | Read-Only Memory |
| $S_C$ | Calibration Slope |
| $S_{MAX}$ | Maximum Acceptable Slope |
| SSR | Solid-State Relay |
| V | Volt |
| WPAN | Wireless Personal Area Network |

MODE(S) FOR CARRYING OUT THE INVENTION

For 40 years Crestron Electronics, Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein can be manufactured by Crestron Electronics Inc., located in Rockleigh, N.J.

The different aspects of the embodiments described herein pertain to the context of a light or a photo sensor, but is not limited thereto, except as may be set forth expressly in the appended claims. Referring to FIG. 1, there is shown a lighting control system 100 according to an illustrative aspect of the embodiments. According to an embodiment, the lighting control system 100 can operate as a room-based, standalone system. Lighting control system 100 may be installed in a room 101 and may comprise one or more load controllers 102, one or more battery powered lighting control devices 103, and a light sensor 104, also referred to as a light sensor or a daylight sensor. The lighting control system 100 may be installed in an office, classroom, conference room, residential room, or the like.

Light sensor 104 is configured for detecting and measuring light intensities in a room to enable daylight harvesting applications. Light sensor 104 may monitor natural daylight from windows and signal the lighting control system 100 to raise or lower the lights according to natural light fluctuations, reducing energy usage while maintaining a consistent light level for a more efficient and comfortable work or living space. FIG. 2 is an illustrative block diagram of a light sensor 104. Light sensor 104 may include various circuit components configured for detecting light levels, receiving control commands, and transmitting commands wirelessly to a load controller 102, or other in-room devices. Light sensor 104 may comprise a light sensing module 203 configured for detecting light levels. According to an embodiment, light sensor 104 can comprise a dual-loop photosensor having two internal photocells with 0-65535 lux (0-6089 foot-candles) light sensing, one for open-loop daylight sensing and one for closed-loop ambient light sensing to measures light intensity from natural daylight and ambient light sources. In an illustrative embodiment, light sensor 104 may comprise similar configuration as the GLS-LDL-EX-BATT, Battery-Powered Photosensor with infiNET EX®, available from Crestron Electronics, Inc. of Rockleigh, N.J. The light sensor 104 may comprise a sideways facing sensor to determine sunlight levels. The light sensor 104 may be installed near a sunlit window with the open loop sensor (or side sensor) facing the window. Light sensor 104 may communicate the detected light intensity to the load controller 102. Detected light intensities can be used in operation of the lighting control system 100, for example, for daylight harvesting to effectively cut energy costs. The load controller 102 may reduce its output to dim the lighting load 106 based on the sunlight level reported by the light sensor 104.

Light sensor 104 may comprise a power supply 210 configured for providing power to the various circuit components of the light sensor 104. In one embodiment, the power supply 210 may comprise a battery, such as a BR2032 coin cell battery. In another embodiment, light sensor 104 may be connected to line voltage.

Light sensor 104 may also comprise a user interface 204, such as one or more buttons, configured for commanding the sensor 104 to enter into a calibration mode, a test mode, a network joining mode, a commissioning mode, or the like. Light sensor 104 may further comprise a light indicator 209, such as one or more light emitting diodes (LEDs), to display a status of the sensor 104. For example, the light indicator 209 may indicate whether the light sensor 104 is trying to join a network, when it is configured, or the like.

Light sensor 104 can further comprise a central processing unit (CPU) 201. CPU 201 can represent one or more microprocessors, and the microprocessors can be "general purpose" microprocessors, a combination of general and special purpose microprocessors, or application specific integrated circuits (ASICs). Additionally, or alternatively, the CPU 201 can include one or more reduced instruction set (RISC) processors, video processors, or related chip sets. The CPU 201 can provide processing capability to execute an operating system, run various applications, and/or provide processing for one or more of the techniques and functions described herein. CPU 201 can process various commands and perform operations, such as calibrating the light sensor 104, allowing the light sensor 104 to join the wireless network 110, or the like.

Light sensor 104 can further include a main memory 207 and a nonvolatile memory 208. Main memory 207 can be communicably coupled to the CPU 201, which can store data and executable code. The main memory 207 can represent volatile memory such as random-access memory (RAM), but can also include nonvolatile memory, such as read-only memory (ROM) or Flash memory. In buffering or caching data related to operations of the CPU 201, the main memory 207 can store data associated with applications running on the control processor 201. The nonvolatile memory 208 can represent any suitable nonvolatile storage medium, such as a hard disk drive or nonvolatile memory, such as Flash memory. Being well-suited to long-term storage, the nonvolatile storage 208 can store data files, software for implementing the functions on the control processor 201, and wireless connection information to establish the wireless network 110.

Light sensor 104 may further comprise a wireless network interface 202 configured for bidirectional wireless communication with other electronic devices, such as the load controller 102, on the wireless network 110. The wireless network interface 202 may comprise a radio frequency (RF) transceiver configured for bidirectional wireless communication using wireless communication protocols, such as the ZigBee® protocol, the infiNET EX® protocol from Crestron Electronics, Inc. of Rockleigh, N.J., or the like.

The lighting control system 100 may further comprise other types of sensors, such as one or more of occupancy sensors, vacancy sensors, infrared sensors, photosensors, ultrasonic sensors, various motion sensors, proximity sensors, sound sensors, microphones, ambient temperature sensors, or the like.

Referring back to FIG. 1, the lighting control system 100 may further comprise a load controller 102 installed in the room 101. The load controller 102 may receive control messages from the lighting control devices 103 and light sensor 104 in the lighting control system 100 to control its associated lighting load 106. Although a single load controller 102 is illustrated, the lighting control system 100 may comprise a plurality of load controllers 102 connected to respective lighting loads 106 within room 101. In another embodiment, the load controller 102 may be grouped with particular control devices 103 and light sensors 104 located within room 101.

The load controller 102 may be mounted to a junction box 105 in the ceiling via a conduit knockout and may comprise a plurality of wire leads 111 extending into the junction box 105. The load controller 102 may comprise a hot wire and a neutral wire connected via a voltage line 112 to an alternating current (AC) power source, such as an AC mains power source, to receive electric AC power signal. In an embodiment, the AC power source may comprise 120 Volt (V) 60 Hertz (Hz) AC mains residential power supply. In other embodiments, the AC power source may supply power at a different voltage or frequency. For example, in another embodiment, the AC power source may supply 220V 50 Hz AC mains power supply. The load controller 102 may be further connected to a lighting load 106 via load line 113 to control the lighting load 106 in response to messages received from the lighting control devices 103 and light sensors 104.

In an alternative embodiment, instead of using a hard wired configuration, the load controller 102 may comprise a plug-in configuration. The load controller 102 may comprise a plug for connection to a wall receptacle to receive electric AC power signal from an AC power source. Additionally, the load controller 102 may comprise a receptacle for receiving a plug from a lighting load 106.

FIG. 3 is an illustrative block diagram of a load controller 102. The load controller 102 may include various circuit components configured for receiving commands and transmitting commands wirelessly to various in-room devices, such as the lighting control devices 103 and light sensors 104. The load controller 102 may comprise a power supply 311 connected to the voltage line 112 for receiving an electric AC power signal from an AC mains power source. The power supply 311 may comprise circuit components configured for converting the incoming AC power signal to a direct current (DC) power signal. For example, the power supply 311 may comprise a bridge rectifier that rectifies the AC voltage signal and converts it into a rectified DC voltage signal. The bridge rectifier may comprise four or more diodes in a bridge circuit configuration which provides the same polarity output for either polarity input of the AC signal. The power supply 311 may also comprise a voltage regulator configured for maintaining a substantially constant voltage level to stabilize the DC voltage signal used by the circuit elements of the load controller 102.

The load controller 102 may comprise a user interface 304, such one or more buttons, configured for commanding the load controller 102 to enter into a test mode, a setup mode, or the like. The load controller 102 may further comprise a status light indicator 309, such as one or more LEDs, for use during setup, maintenance, troubleshooting, or the like.

The load controller 102 can further comprise a CPU 301. CPU 301 can represent one or more microprocessors, and the microprocessors can be "general purpose" microprocessors, a combination of general and special purpose microprocessors, or ASICs. Additionally, or alternatively, the CPU 301 can include one or more RISC processors, video processors, or related chip sets. The CPU 301 can provide processing capability to execute an operating system, run various applications, and/or provide processing for one or more of the techniques and functions described herein. CPU 301 can process various commands and perform operations in response to messages received from in-room devices, such as the lighting control devices 103 and light sensors 104, to control the lighting load 106.

The load controller 102 can further include a main memory 307 and a nonvolatile memory 308. Main memory 307 can be communicably coupled to the CPU 301, which can store data and executable code. The main memory 307 can represent volatile memory such as RAM, but can also include nonvolatile memory, such as ROM or Flash memory. In buffering or caching data related to operations of the CPU 301, the main memory 307 can store data associated with applications running on the control processor 301. The nonvolatile memory 308 can represent any suitable nonvolatile storage medium, such as a hard disk drive or nonvolatile memory, such as Flash memory. Being well-suited to long-term storage, the nonvolatile storage 308 can store data files, software for implementing the functions on the control processor 301, and wireless connection information to establish the wireless network 110.

The load controller 102 may further comprise a wireless network interface 302 configured for bidirectional wireless communication with other electronic devices, such as the lighting control devices 103 and light sensors 104, over the wireless network 110. The wireless network interface 302 may comprise an RF transceiver configured for bidirectional wireless communication using wireless communication protocols, such as the ZigBee® protocol, the infiNET EX® protocol from Crestron Electronics, Inc. of Rockleigh, N.J., or the like.

The load controller may comprise a switch 313 configured for switching a connected lighting load 106 on or off. According to one embodiment, switch 313 may comprise an electromechanical relay configured for switching the lighting load 106 on or off. An electromechanical relay may use an electromagnet to mechanically operate a switch. In another embodiment, a solid-state relay (SSR) may be used to switch the lighting load 106 on or off. The SSR may comprise semiconductor devices, such as thyristors (e.g., TRIAC) and transistors, to switch currents up or down.

In addition, the load controller 102 may comprise a dimmer 312 configured for providing a dimmed voltage output to a connected lighting load 106. The dimmer 312 may comprise a solid-state dimmer for dimming different types of lighting loads 106, including incandescent, fluorescent, LED, or the like. According to an embodiment, the dimmer 312 may comprise a 0-10V DC dimmer to provide a dimmed voltage output to an LED lighting load, a fluorescent lighting load, or the like. In one embodiment, the dimmer 312 may comprise the sinking and sourcing dimmer circuit disclosed in U.S. patent application Ser. No. 15/336,381, filed Oct. 27, 2016, and titled "Dimmer Configured for Providing Sinking and Sourcing, Current Outputs," the entire contents of which are hereby incorporated by reference. The dimmer 312 of the load controller 102 may reduce its output based on sunlight levels reported by the light sensor 104.

In another embodiment, the load controller 102 may comprise a light sensing module 203 discussed above incorporated into the load controller 102 for reading lighting levels.

Referring back to FIG. 1, one or more lighting control devices 103 may be installed in room 101. According to an embodiment, the lighting control device 103 may be battery operated, for example, via a coin cell battery. In one embodiment, the battery powered lighting control device 103 may comprise similar configuration to the battery powered control device disclosed in U.S. patent application Ser. No. 15/342,639, filed Nov. 3, 2016, and titled "Battery Powered Keypad Assembly," the entire contents of which are hereby incorporated by reference.

The lighting control device 103 is configured to serve as a user interface to associated load controllers 102 in a space. In an illustrative embodiment, the lighting control device 103 may be configured to receive control commands directly from a user and transmit the control command to a load controller 102 electrically connected the lighting load 106 to control the lighting load 106 based on the control commands. The lighting control device 103 may comprise a wireless network interface configured for communicating with other in-room devices via an in-room wireless network 110. The lighting control device 103 may comprise a switch, a dimmer, a keypad, or another device configured for receiving control commands from a user. A light switch can be used to control the on/off state of the lighting load 106. A dimmer may be configured to control the on/off state of the lighting load 106 as well as to control a dimming level of the load 106. A keypad, such as the lighting control device 103 illustrated in FIG. 1, may comprise a plurality of buttons 107 configured to control multiple load devices, such as the lighting load 106, as well as other type of loads such as shade or drapery devices, heating, ventilation and air conditioning (HVAC) systems, audiovisual (AV) devices, or the like. In another embodiment, a keypad may comprise a plurality of buttons corresponding to different lighting scenes, such as a day scene and a night scene, with different dimming modes that may be preconfigured by the user.

According to another embodiment, instead of utilizing a separate load controller 102, the lighting control device 103 may comprise a load controller and be directly wired to the lighting load 106 to control the operation of the lighting load 106. According to an embodiment, the lighting control devices 103 may comprise similar components as shown in FIG. 3, including a user interface 304 (e.g., buttons 107), a light indicator 309, a power supply 311, a dimmer 312, a switch 312, a wireless network interface 302, a CPU 301, a main memory 307, and a nonvolatile memory 308. The lighting control device 103 may control the lighting load 106 based on detected light levels received from the light sensor 104. Particularly, a dimmable lighting control device 103 may reduce its output based on the sunlight levels reported by the light sensor 104. In another embodiment, the lighting control device 103 may comprise a light sensing module 203 discussed above incorporated into the lighting control device 103 for reading lighting levels. As such, the operation of the light sensor 104, load controller 102, and the lighting control device 103 may be integrated into a single device.

The various in-room devices, including the load controller 102, lighting control device 103, and light sensor 104, may intercommunicate with each other using the wireless network 110. In one embodiment, wireless network 110 can comprise one or more wireless personal area networks (WPANs). Communication protocols govern the operation of the wireless network 110 of the lighting control system 100 by governing network formation, communication, interferences, and other operational characteristics. For example, one such protocol is the ZigBee® protocol from the ZigBee Alliance. Another wireless communication protocol is the infiNET EX® protocol from Crestron Electronics, Inc. of Rockleigh, N.J. infiNET EX® is an extremely reliable and affordable protocol that is employed by 2-way wireless wall box dimmers and switches, lamp dimmers and switches, plus thermostats and keypads, and other sensors and control devices. infiNET EX® utilizes 16 channels on an embedded 2.4 GHz radio frequency (RF) wireless network, providing more stable, reliable wireless communications over larger areas without the need for additional control wiring.

In an embodiment, the wireless network 110 of the lighting control system 100 between the load controller 102, lighting control device 103, and light sensor 104 is automatically formed upon installation during a wireless network initialization process. The in-room devices can communicate directly with each other via a pairing process— e.g., tapping buttons on the load controller 102, lighting control device 103, and light sensor 104 links these devices together to form the in-room wireless network 110. According to an embodiment, one of the in-room devices, such as one of the load controllers 102 or lighting control devices 103, may act as a router and can take on role of the network coordinator configured for forming the in-room wireless network 110. This in-room device may contain a button which commands the in-room device to form the network 110. In response, the in-room device will act as the network coordinator and will pick the best channel and select a random personal area network (PAN) identification number (ID) and establish the network 110. The network coordinator may then permit the other in-room devices to join the network 110. To join the network 110, the other in-room devices can comprise dedicated buttons, or button combinations, configured for commanding the devices to join the network 110. In response, the devices will initiate a network scan to search for best available network. If a network is available and permits devices to join it, the in-room device will perform an association to that network, for example by sending a join request to the network coordinator and receiving a join confirmation message from the network coordinator. According to an embodiment, the in-room device will undergo a security procedure for authentication. If authentication is successful, the in-room device can start acting as an end device and the network coordinator may act as a network manager.

After the network formation, the lighting control system 100 can respond to sunlight levels, button presses, and any integration points through the load controller 102.

The present embodiments pertain to systems, methods, and modes for a quick and simple to implement calibration process of a light sensor 104. The calibration process implemented by the lighting control system 100 automatically determine a calibration curve comprising a calibration slope ($S_C$). The load controller 102 will implement the calibration curve to map sunlight levels reported by the light sensor 104 to a target dimmer level and control the lighting load 106 based on the target dimmer level. The calibration curve is a fixed parameter defined by two coordinates, a calibration coordinate ($C_C$) and a night coordinate ($C_N$), which is automatically determined using the current sunlight conditions in the room 101.

The calibration coordinate ($C_C$) is obtained during the calibration process with the lights on at a desired dimming level, referred herein as the calibration dimming level ($D_C$), for current sunlight conditions. The calibration x-coordinate is the light level, referred herein as the calibration light level ($L_C$), reported by the light sensor 104 during the calibration process with lights on at the desired dimming level ($D_C$). The calibration y-coordinate is the desired dimming level ($D_C$) at which the lights have been set to prior to running the calibration.

The night coordinate ($C_N$) is based on what the light sensor 104 is expected to read at night with no external sunlight entering the room 101, i.e. all light is generated from the artificial lighting load 106. The night coordinate ($C_N$) is obtained during the calibration process by taking sunlight readings with lights on at a night scene where the lights are turned on to a night dimming level ($D_N$) (for example, 90% dimming level) and again with lights off. The difference between these readings is the night x-coordinate or the night scene light level ($L_N$), which is the amount of light the light sensor 104 is expected to see when lights are at the night scene and no sunlight entering the room 101. The night y-coordinate is defined as the night scene dimming level ($D_N$).

FIG. 4 is a flowchart 400 illustrating the steps for a method of automatically determining a calibration curve according to according to an illustrative aspect of the embodiments. In step 402, at some point during the day, given the current sunlight conditions, the installer may adjust the lighting load 106 to a desired dimming level, referred herein as the calibration dimming level ($D_C$), using the lighting control device 103. The calibration dimming level ($D_C$) is manually chosen to some acceptable brightness level in room 101 given the amount of sunlight coming into the room 101. According to an embodiment, the installer may use a meter to determine a desired brightness level in room 101 and dim the lighting load 106 accordingly. In step 404, the installer may initiate the calibration process at the light sensor 104. For example, the installer may initiate a calibration command by holding a SETUP button on the user interface 204 of the light sensor 104 for a predetermined length of time, such as five seconds. According to the present embodiments, no further interaction is required by the installer.

During the calibration process, in step 406, the light sensor 104 will obtain calibration data, as discussed below, and transmit the calibration data to the load controller 102. In step 408, the load controller will use the calibration data to automatically determine the calibration curve. While the embodiments herein are described with the load controller 102 determining the calibration curve, the calibration curve may be alternatively determined by the processor of the light sensor 104 or the lighting control device 103.

FIG. 5 is a flowchart 500 illustrating the steps for a method performed by the light sensor 104 during the calibration process according to an illustrative aspect of the embodiments. As discussed above, the installer initiates the calibration process by manually setting the brightness of the artificial lighting load 106 to a desired dimming level, which will be used by the load controller 102 as the calibration dimming level ($D_C$), and initiating a calibration command at the light sensor 104. In step 502, the light sensor 104 receives the calibration command from the user. In response, in step 504, the light sensor 104 may indicate to the user via the light indicator 209 that the calibration process has been initiated. For example, the light indicator 209 may blink green two times to indicate that the light sensor 104 has initiated the calibration process. Thereafter, the light indicator 209 may repeatedly blink red while calibration is in progress and cease blinking when the calibration has been ended. In step 506, the light sensor 104 may inform the load controller 102 that calibration is in process, for example, by sending to the load controller 102 an initiate calibration message.

In step 508, the light sensor 104 may wait for a predetermined amount of time, such as five seconds, before starting to take any sensor readings to allow the installer to move out of the way. In step 510, the light sensor 104 may capture a calibration light level ($L_C$), which is the light level captured by the light sensor 104 with lighting load 106 on at the desired calibration dimming level ($D_C$). According to an embodiment, the light sensor 106 may record a plurality of light levels, for example about every two seconds for approximately twelve seconds, and average these measurements to determine the calibration light level ($L_C$).

Then, in step 512, the light sensor 104 may transmit a command to set the lighting load 106 to a night scene dimming level ($D_N$). According to an embodiment, the light sensor 104 may transmit the command to the load controller 102 or to a lighting control device 103 comprising a load controller. The night scene dimming level ($D_N$) is a dimming level at which the lights are set to be turned on during the night with no sunlight entering the room 101. Typically, at night the lighting load 106 would be set at or substantially close to its full brightness. In daylight harvesting operation, this is the highest dimming level the lights would reach. The night scene dimming level ($D_N$) may indicate to turn the lights fully on at 100%. However, other night scene dimming level ($D_N$) may be utilized, for example a 90% dimming level. The night scene dimming level ($D_N$) may be in the range of about 75% to about 100%. The night scene dimming level ($D_N$) may be a default dimming level, or a dimming level preset by the user as a night scene. The night scene dimming level ($D_N$) may be a preset night scene on one of the buttons 107 of the lighting control device 103. In step 514, the light sensor 104 will then capture a sunlight plus night scene light level ($L_{NS}$). Particularly, the light sensor 104 will record at least one light level with the lights turned on at the night scene dimming level ($D_N$). These readings will capture both the sunlight entering the room and the light generated by the artificial lighting load 106. According to an embodiment, the light sensor 104 may record a plurality of light levels, for example every two seconds for twelve seconds, and average these measurements to determine the sunlight plus night scene night level ($L_{NS}$).

In step 516, the light sensor 104 will transmit a command to turn the lighting load 106 fully off. According to an embodiment, the light sensor 104 may transmit the command to the load controller 102 or to a lighting control device 103 comprising a load controller. In step 518, the light sensor 104 will then capture a sunlight level ($L_S$). Particularly, the light sensor 104 will record at least one light level with the lights turned fully off. These readings will only capture the sunlight levels entering the room. According to an embodiment, the light sensor 104 may record a plurality of light levels, for example every two seconds for twelve seconds, and average these measurements to determine the sunlight level ($L_S$).

In step 520, the light sensor 104 may calculate the difference between the sunlight plus night scene light level ($L_{NS}$) and the sunlight level ($L_S$) to determine the night scene light level ($L_N$), which is the amount of light the light sensor 104 is expected to see when lights are at the night scene at night with no sunlight entering the room 101. Particularly, the light sensor 104 will calculate the night scene light level as follows:

$$L_N = L_{NS} - L_S \quad \text{Formula 1}$$

where,
$L_N$ is the night scene light level;
$L_{NS}$ is the sunlight plus night scene light level; and
$L_S$ is the sunlight level.

The process of calculating the night scene light level ($L_N$) disclosed herein eliminates the need for a field technician to return to the site at night and repeat the process to obtain the night calibration point. In use, the disclosed process results in the lighting load 106 reaching the night scene brightness level when there is no sunlight entering the room 101.

In step 522, the light sensor 104 sends the captured calibration data, including the calibration light level ($L_C$) and the night scene light level ($L_N$), to the load controller 102. The light sensor 104 may send the captured calibration data as a single data packet or a plurality of data packets anytime during the calibration process.

FIG. 6 is a flowchart 600 illustrating the steps for a method performed by the load controller 102 during the calibration process according to an illustrative aspect of the embodiments. In step 602, the load controller 102 will receive a message from the light sensor 104 that calibration is in process, and in response may initiate light sensor calibration. According to an embodiment, after initiating the calibration process, the load controller 102 will ignore messages and control commands received from other sensors or in-room devices to prevent calibration errors. In step 604, the lighting load 102 will record the currently set dimming level as the calibration dimming level ($D_C$). In step 606, the load controller 102 receives the calibration data, including the calibration light level ($L_C$) and the night scene light level ($L_N$), from the light sensor 104.

In step 608, the load controller 102 will store a calibration coordinate ($C_C$). Particularly, for the calibration coordinate ($C_C$), the load controller 102 will use the calibration light level ($L_C$) reading as a calibration x-coordinate and the calibration dimming level ($D_C$) as the calibration y-coordinate. Referring to FIG. 7, there is shown an illustrative sensor light level (L) versus dimmer level (D) chart 700. For example, the load controller 102 may record calibration coordinate ($C_C$) 701 comprising a calibration light level ($L_C$) reading 704 as a calibration x-coordinate and the calibration dimming level ($D_C$) 702 as the calibration y-coordinate. In step, 610, the load controller 102 will store a night coordinate ($C_N$). For the night coordinate ($C_N$), the load controller 102 will use the night scene light level ($L_N$) as the night x-coordinate and the night dimming level ($D_N$) as the night y-coordinate. For example, referring to FIG. 7, the load controller 102 may record night coordinate ($C_N$) 710 comprising a night scene light level ($L_N$) reading 714 as a night x-coordinate and the night dimming level ($D_N$) 712 as the night y-coordinate.

In step 612, the load controller 102 will determine a linear calibration curve (y=-mx+c) comprising a calibration slope ($S_C$) that is defined by and intercepts the two coordinates, the calibration coordinate ($C_C$) and the night coordinate ($C_N$). For example, referring to FIG. 7, the load controller 102 will calculate calibration curve 720 using the calibration coordinate ($C_C$) 701 and night coordinate ($C_N$) 710.

According to an embodiment, in step 614, the load controller 102 will determine whether the calculated calibration curve is too steep by comparing the slope of the calculated calibration curve ($S_C$) to a predetermined maximum acceptable slope ($S_{MAX}$). For example, the maximum acceptable slope ($S_{MAX}$) may comprise about -10. The steepness of the curve is limited to avoid oscillations of the lights. If the slope of the calculated calibration curve ($S_C$) is larger than the maximum acceptable slope ($S_{MAX}$), then the maximum acceptable slope ($S_{MAX}$) will be adopted for the calibration curve in step 616. This can occur when the calibration process was performed with minimal sunlight level present resulting in a slope that exceeded the maximum allowable slope. For example, referring to FIG. 8, calibration curve 820 represent an improperly calibrated system with an overly steep slope ($S_C$), which is limited to slope 821 comprising the maximum acceptable slope ($S_{MAX}$) to avoid oscillations. In step 622, the load controller 102 stores the calibration curve comprising the maximum acceptable slope ($S_{MAX}$) in its memory. If the slope of the calculated calibration curve ($S_C$) is not larger than the maximum acceptable slope ($S_{MAX}$), then the process proceeds to step 618.

In step 618, the load controller 102 determines whether the slope of the calculated calibration curve ($S_C$) is inverted. During a normal daylight harvesting operation, the calibration curve comprises a negative slope, as shown in FIG. 7. If the slope is inverted (i.e., if it is positive), then the load controller 102 will issue an error message 620, ending the calibration process. As such, the light sensor 104 remains disabled and/or not configured such that changes in sunlight does not change dimming levels of the lighting load 106. An inverted slope can occur when the lights were dimmed too much and there is not much sunlight coming into the room 101 such as the actual amount of light in the room is less than night time. According to an embodiment, in response to the error message 620, the light sensor 104 may provide an indication via the light indicator 209 that calibration process has failed. The installer can try to again calibrate the light sensor 104, this time being less aggressing with the desired dimming level. If the slope is not inverted, as determined in step 618, then the load controller 102 will store the calculated calibration curve comprising the calibration slope ($S_C$) in its memory in step 622.

Once the calibration process is complete, the load controller 102 may be enabled in a "Test mode", either automatically, or upon an instruction from the user. In the test mode, the load controller 102 may set the lighting load 106 to the night scene. While in Test mode, the lights will react quickly to changes in sunlight so system operation may be tested out. Particularly, the light sensor 104 may report light level readings at a fast rate (for example, every five seconds) and the load controller 102 may also respond to light level reading at a faster rate (for example, moving towards a new target level at a rate equivalent to covering the fully dim range in 30 seconds). This allows the installer to verify the system operation while shining a flashlight on the light sensor 104. Once the test mode times out (e.g., after two minutes) the system will exit the test mode and resume normal operation. During normal operation, the system will return to operate at a slower rate where the lights will react slowly to any changes in sunlight level. For example, where the light sensor reports light level readings every fifteen seconds and the load controller 102 moves to target dimming level at a slow rate equivalent to covering fully dimming range in 250 seconds or longer.

Referring to FIG. 7, during normal daylight harvesting operation, the load controller 102 will receive light level readings from the light sensor 104. According to an embodiment, the light sensor 104 may take light level readings about every 15 seconds, and transmit new levels, e.g., a luminance value, to the load controller 102. In an embodiment, the light sensor 104 may transmit new levels if the change in the light level since last transmission is greater than a predetermined minimum change parameter (or "Min_Change"), for example of around 2 lux. If the difference is less than the Min_Change parameter, the lux value may be reported about every 3 minute.

In response to receiving a light level reading from the light sensor 104, the load controller 102 will implement the calibration curve 720 to map the light level (L) reported by light sensor 104 to target a corresponding dimmer level (D). As the light sensor 104 reading increases (moving right on x-axis), the load controller 102 will reduce its light level based on the curve 720. According to one embodiment, the load controller 102 will adjust the lighting load 106 until the lighting load 106 is fully turned off. According to another embodiment, beyond some light level reading (moving right on x-axis), the load controller 102 will reach a predefined minimum dimming level 725, below which the load controller 102 will not adjust the lighting load 106 down based on the light sensor 104. For example, this predefined minimum dimming level may comprise about 10% dimming level. Likewise, below some sunlight level (moving left on x-axis), the load controller 102 will reach the night scene dimming level ($D_N$) 712 (e.g., 90%), above which the load controller 102 will not adjust the lighting load 106 up based on the light sensor 104.

According to an embodiment, daylight harvesting may be disabled when any scene (other than the night scene) is selected or raise/lower message is received from the lighting control device 103. Daylight harvesting may be re-enabled when the load controller 102 is turned on from the night scene button on the lighting control device 103, or from an occupancy sensor, or when a button on the user interface 304 of the load controller 102 is pressed.

According to an embodiment, the lighting control system 100 may comprise a plurality of load controllers 102 installed in the room, which adjust their respective lighting loads 106 based on readings received from a single light sensor 104. In such an implementation, each load controller 102 may be adjusted to a desired brightness level given the current sunlight entering the room 101. As such, each load controller may comprise a different desired calibration dimming level ($D_C$), resulting in a different calibration curve. For example, referring to FIG. 9, there may be two load controllers 102 and their calibration dimming levels ($D_{C1}$) 901 and ($D_{C2}$) 902 may be set at different dimmer levels. The first load controller may be set to a higher dimming level of about 80% when the calibration process is initiated, resulting in a first calibration curve 905, compared to about 60% dimming level for the second load controller, resulting in steeper calibration curve 915.

While the various steps are described above as being performed by particular elements of the lighting control system 100, they are not limited thereto. Some of the steps disclosed in FIG. 5 may be performed by the load controller 102 and/or the lighting control device 103, some or all of the steps disclosed FIG. 6 may be performed by the light sensor 104 and/or the lighting control device 103. In another embodiment, all the steps disclosed in FIGS. 4-6 may be performed by the light sensor 104. In another embodiment, the functionality of the light sensor 104, load controller 102, and lighting control device 103 may be implemented in a single device (e.g., a wired wall keypad with an integrated light sensing module), such that all the steps disclosed in FIGS. 4-6 may be performed by such a single device.

INDUSTRIAL APPLICABILITY

The disclosed embodiments provide a system, software, and a method for a light sensor calibration system and method. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

Additionally, the various methods described above are not meant to limit the aspects of the embodiments, or to suggest that the aspects of the embodiments should be implemented following the described methods. The purpose of the described methods is to facilitate the understanding of one or more aspects of the embodiments and to provide the reader with one or many possible implementations of the processed discussed herein. The steps performed during the described methods are not intended to completely describe the entire process but only to illustrate some of the aspects discussed above. It should be understood by one of ordinary skill in the art that the steps may be performed in a different order and that some steps may be eliminated or substituted. For example, in FIG. 4 steps 402 and 404 may be reversed, in FIG. 5 the steps may be performed in a different order and steps 504, 506, 508 may be eliminated, and in FIG. 6 the steps may be performed in a different order and steps 602, and 614-620 may be eliminated.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments.

What is claimed is:

1. A lighting control system for calibrating a light sensor comprising:
    a light sensor configured for recording light levels;
    a load controller electrically connected to a lighting load and configured for providing a dimmed output to the lighting load;
    at least one processor comprising a memory encoding one or more processor executable instructions, wherein the at least one processor is configured for determining a calibration curve by:
        receiving a command to initiate calibration;
        recording a set dimming level of the lighting load as a calibration dimming level ($D_C$);

storing a calibration coordinate ($C_C$) comprising the calibration dimming level ($D_C$) and a calibration light level ($L_C$) recorded by the light sensor when the lighting load is set to the calibration dimming level ($D_C$);

storing a night coordinate ($C_N$) comprising a night scene dimming level ($D_N$) and a night scene light level ($L_N$), wherein the night scene light level ($L_N$) comprises a difference between a sunlight plus night scene light level ($L_{NS}$) recorded by the light sensor when the lighting load is set to the night scene dimming level ($D_N$) and a sunlight level ($L_S$) recorded by the light sensor when the lighting load is turned off;

determining a calibration curve comprising a calibration slope ($S_C$) that intercepts the calibration coordinate ($C_C$) and the night coordinate ($C_N$).

2. The lighting control system of claim 1, wherein the light sensor is configured for transmitting the recorded light levels to the load controller.

3. The lighting control system of claim 1, wherein the calibration curve is determined by the light sensor or the load controller.

4. The lighting control system of claim 1, wherein the load controller is further configured for receiving control commands from a lighting control device, wherein the lighting control device comprises a user interface configured for receiving control commands from a user.

5. The lighting control system of claim 4, wherein the lighting control device is configured for determining the calibration curve.

6. The lighting control system of claim 1, wherein the load controller comprises a lighting control device comprising a user interface configured for receiving control commands from a user.

7. The lighting control system of claim 1, wherein the light sensor is incorporated with the load controller.

8. The lighting control system of claim 1, wherein the calibration dimming level ($D_C$) is manually set by a user.

9. The lighting control system of claim 8, wherein the calibration dimming level ($D_C$) is set by the user before initiating calibration or during calibration.

10. The lighting control system of claim 1, wherein the command to initiate calibration is received from a user interface.

11. The lighting control system of claim 1, wherein after initiating calibration, the light sensor is configured for waiting for a predetermined amount of time before capturing the calibration light level ($L_C$).

12. The lighting control system of claim 1, wherein the light sensor records a plurality of light levels and averages these measurements to determine the calibration light level ($L_C$), the sunlight plus night scene night level ($L_{NS}$), and the sunlight level ($L_S$).

13. The lighting control system of claim 1, wherein the light sensor transmits a command to the load controller to set the lighting load to the night scene dimming level ($D_N$) to record the sunlight plus night scene light level ($L_{NS}$); and wherein the light sensor transmits a command to the load controller to turn the lighting load off to record the sunlight level ($L_S$).

14. The lighting control system of claim 1, wherein the light sensor calculates the night scene light level ($L_N$).

15. The lighting control system of claim 1, wherein the night scene dimming level ($D_N$) is a dimming level at which the lighting load is set to be turned on during the night.

16. The lighting control system of claim 1, wherein the night scene dimming level ($D_N$) comprises a dimming level in the range of about 75% to about 100%.

17. The lighting control system of claim 1, wherein the at least one processor is further configured for:
determining whether the determined calibration slope ($S_C$) is larger than a maximum acceptable slope ($S_{MAX}$);
when the determined calibration slope ($S_C$) is larger than the maximum acceptable slope ($S_{MAX}$), adopting the maximum acceptable slope ($S_{MAX}$) for the calibration curve;
when the determined calibration slope ($S_C$) is smaller than the maximum acceptable slope ($S_{MAX}$), adopting the determined calibration slope ($S_C$) for the calibration curve.

18. The lighting control system of claim 1, wherein the at least one processor is further configured for:
determining whether the determined calibration slope ($S_C$) is inverted;
when the determined calibration slope ($S_C$) is inverted, issuing an error message; and
when the determined calibration slope ($S_C$) is not inverted, adopting the determined calibration slope ($S_C$) for the calibration curve.

19. The lighting control system of claim 1, wherein the load controller uses the calibration curve for daylight harvesting operation during which the load controller is configured for:
receiving a light level reading from the light sensor;
mapping the received light level reading to the calibration curve to determine a corresponding dimming level; and
adjusting the lighting load to the corresponding dimming level.

20. The lighting control system of claim 19, wherein when the corresponding dimming level is lower than a predefined minimum dimming level, the load controller is configured for adjusting the lighting load to the minimum dimming level.

21. The lighting control system of claim 19, wherein when the corresponding dimming level is larger than the night scene dimming level ($D_N$), the load controller is configured for adjusting the lighting load to the night scene dimming level ($D_N$).

22. A lighting control system for calibrating a light sensor comprising:
a light sensor configured for detecting light levels, wherein the light sensor is configured for receiving a calibration command and in response:
capturing a calibration light level ($L_C$) when a lighting load is set to a calibration dimming level ($D_C$);
transmitting a command to set the lighting load to a night scene dimming level ($D_N$);
capturing a sunlight plus night scene light level ($L_{NS}$) when the lighting load is set to the night scene dimming level ($D_N$);
transmitting a command to turn the lighting load off;
capturing a sunlight level ($L_S$) when the lighting load is turned off;
determining a night scene light level ($L_N$) by calculating a difference between the sunlight plus night scene light level ($L_{NS}$) and the sunlight level ($L_S$);
transmitting the calibration light level ($L_C$) and the night scene light level ($L_N$);
a load controller electrically connected to the lighting load and configured for providing a dimmed output to the lighting load, wherein the load controller is further configured for determining a calibration curve by:

recording a set dimming level of the lighting load as the calibration dimming level ($D_C$);

receiving the calibration light level ($L_C$) and the night scene light level ($L_N$);

storing a calibration coordinate ($C_C$) comprising the calibration dimming level ($D_C$) and the calibration light level ($L_C$);

storing a night coordinate ($C_N$) comprising the night scene dimming level ($D_N$) and the night scene light level ($L_N$); and determining a calibration curve comprising a calibration slope ($S_C$) that intercepts the calibration coordinate ($C_C$) and the night coordinate ($C_N$).

23. A method of calibrating a light sensor comprising:

initiating calibration;

recording a set dimming level of a lighting load as a calibration dimming level ($D_C$);

capturing a calibration light level ($L_C$) by a light sensor when the lighting load is set to the calibration dimming level ($D_C$);

storing a calibration coordinate ($C_C$) comprising the calibration dimming level ($D_C$) and the calibration light level ($L_C$);

setting the lighting load to a night scene dimming level ($D_N$);

capturing a sunlight plus night scene light level ($L_{NS}$) by the light sensor when the lighting load is set to the night scene dimming level ($D_N$);

turning the lighting load off;

capturing a sunlight level ($L_S$) by the light sensor when the lighting load is turned off;

storing a night coordinate ($C_N$) comprising the night scene dimming level ($D_N$) and a night scene light level ($L_N$) comprising a difference between the sunlight plus night scene light level ($L_{NS}$) and the sunlight level ($L_S$);

determining a calibration curve comprising a calibration slope ($S_C$) that intercepts the calibration coordinate ($C_C$) and the night coordinate ($C_N$).

\* \* \* \* \*